United States Patent Office 3,159,835
Patented Dec. 1, 1964

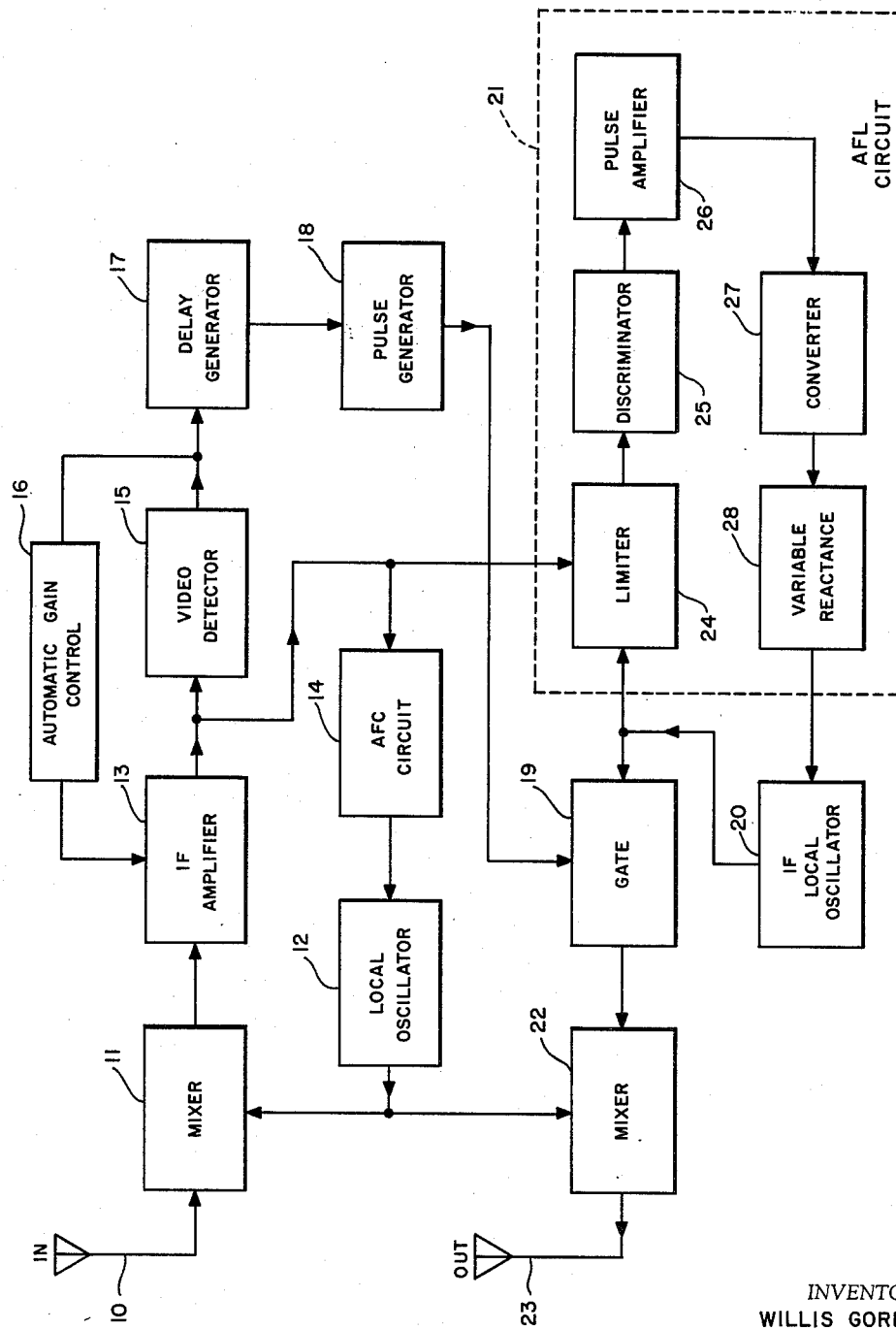

3,159,835
AUTOMATIC FREQUENCY LOCKING CIRCUIT
Willis Gore, Baltimore County, Md., assignor to Aircraft Armaments, Inc., Cockeysville, Md., a corporation of Maryland
Filed Aug. 22, 1958, Ser. No. 758,169
5 Claims. (Cl. 343—17.7)

This invention relates to a test set of the class used to test the range calibration of a radar set which transmits RF pulses and receives reflected pulses from a target which are delayed in time with respect to the transmitted pulses such that the target range can be evaluated. More particularly, the invention relates to a test set of this class which is separate from the radar set and presents thereto, a simulated target in the form of artificial echo pulses, whose delay with respect to the transmitted pulses is variable, and whose frequency with respect to the transmitted pulses is the same.

In test sets of this general class, RF radar pulses are received by the test set antenna, fed through a waveguide system to a mixer, and beat with a local oscillator to produce IF pulses which are amplified in an IF amplifier. The output of the IF amplifier feeds a discriminator of a conventional AFC circuit, which maintains substantially constant, the difference between the frequency of the local oscillator and the frequency of the RF radar pulses. The output of the IF amplifier is also fed to a video detector. The video pulses produced thereby are delayed and applied to control the gate of a gated amplifier. A crystal controlled oscillator produces a continuous wave signal at a frequency substantially the same as the difference between the frequency of the local oscillator and the frequency of the RF radar pulse. This signal is converted to pulses at the frequency of the IF pulses in the gated amplifier, and then recombined with the local oscillator in another mixer to create an RF echo pulse at the original radar frequency. Such a test set is shown in the application of Feffer et al., Serial No. 350,002 filed April 21, 1953, now abandoned.

In devices of the class just described, the cross-over frequency of the discriminator in the AFC circuit is that of the IF frequency desired so that the local oscillator is locked at a frequency removed from the frequency of the RF radar pulse by the IF frequency. But the signal at the IF frequency returned to the local oscillator is generated by another oscillator which is not connected by a closed loop to the remainder of the circuit. This introduces a frequency over which there is no automatic control such that constant tuning is required in order to insure that combining the oscillator signal with the output of the local oscillator should result in a frequency that is the same as the original radar frequency. Without such constant tuning, the RF echo pulse is uncontrollable and becomes unpredictable, with the result that the test set performs erratically because the passband of a radar receiver is generally narrow.

Much effort has been expended to contribute a test set of the class described which is capable of presenting to a radar set from a signal source entirely external thereto, an RF echo pulse whose range is variable and whose frequency is the same as that of the RF radar pulse without a tuning adjustment of the test set, but so far as is known, no successful test set of the class described has yet been contributed to the art, and the problem here outlined remained unsolved. It is an object of this invention to contribute a device of the class described, and employing components of known design and reliability, which is capable of automatically locking the frequency of a continuous wave oscillator to the frequency of an externally supplied pulsed reference signal when there is no phase coherence in the pulsed signal such that there is no real obstacle presented to creating and automatically maintaining an RF echo pulse at a frequency as close as desirable to the RF radar pulse.

As a feature of the invention whereby the objects thereof are obtained, an exceedingly novel automatic frequency locking (AFL) circuit is utilized which locks a continuous wave oscillator to the pulsed IF frequency of the test set by arranging to have the amplitude of the pulsed signal exceed that of the continuous wave oscillator signal, and feeding both signals into a limiter stage placed ahead of a standard AFC circuit for the oscillator.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other apparatus for carrying out the several purposes of this invention. It is important, therefore, that the claims to be granted herein shall be of sufficient breadth to prevent the appropriation of this invention by those skilled in the art.

The single figure of the drawing illustrates a block diagram of a preferred embodiment of apparatus employing the principles of the invention.

Referring now more particularly to the drawing, the test set in which the invention is embodied is shown having a receiving antenna 10 which is placed adjacent the transmitting antenna of a radar set (not shown) to receive RF radar pulses therefrom. An RF radar pulse passes through conventional waveguide structure to mixer 11, where it is beat with the output of local oscillator 12 to produce a pulse at an intermediate frequency. The IF pulse is amplified in tuned IF amplifier 13, and a part of the output is fed to AFC circuit 14, which is conventional in nature and includes a discriminator circuit whose cross-over frequency is the IF frequency. AFC circuit 14 automatically tunes local oscillator 12 to a frequency which is removed from the frequency of the RF radar pulse by an amount equal to the IF frequency.

A part of the output of IF amplifier 13 is also fed to video detector 15 which converts the IF pulse from amplifier 13 to a video pulse substantially coincident in time with the RF radar pulse. Automatic gain control 16 may be incorporated between detector 15 and amplifier 13. The video pulse out of detector 15 triggers delay generator 17. Delay generator 17 may be the type well-known to those skilled in the art which is capable of receiving a video pulse out of detector 15, and converting the same in pulse generator 17 to a trigger pulse delayed in time with respect to the RF radar pulse. Those skilled in the art will appreciate that the amount of delay can be varied in the test set in order to simulate different target ranges.

Continuous wave oscillator 20 produces a continuous wave signal. The frequency of oscillator 20 is maintained as close to the IF frequency as desired by the automatic frequency locking (AFL) circuit to be desired in detail later. When the gate of amplifier 19 is opened by the delayed trigger pulse, the output of oscillator 20 is converted to a pulse at the IF frequency. This pulse, having a width substantially the same as that of the RF radar pulse, is combined in mixer 22 with the output of oscillator 12. Thus, at transmitting antenna 23, an RF echo pulse appears which is delayed in time with respect to the RF radar pulse.

As can be seen from the drawing, oscillator 12 is automatically tuned to maintain its frequency such that the IF pulse frequency remains substantially constant. The signal generated by oscillator 20 when combined in mixer 22 results in a frequency at antenna 23 which is substantially that of the original radar pulse. Thus, a signal is presented to a radar set which appears to be an echo pulse reflected from a target.

The introduction of oscillator 20 into the system requires some means to automatically control its frequency such that the artificial echo pulse produced at antenna 23 is substantially the same frequency as that of said RF radar pulse. AFL circuit 21 accomplishes this by locking the frequency of continuous wave oscillator 20 to the frequency of the IF pulse out of amplifier 13. As seen in the drawing, circuit 21 consists of discriminator 25, pulse amplifier 26, converter 27, variable reactance 28 and limiter 24, all of which constitutes a conventional AFC circuit with the exception of limiter 24. In order for circuit 21 to function properly, it is necessary to adjust oscillator 20 such that the amplitude of the IF pulse exceeds the amplitude of the continuous wave signal at the input to limiter 24.

Those skilled in the art recognize that a very interesting and important feature of an FM system, is known as "capture" or "channel-grabbing." This is the tendency of the FM system to ignore the weaker of two signals of nearly equal amplitude and equal or nearly equal frequencies. Such feature is utilized in circuit 21 where a composite of two signals of different amplitudes is applied to limiter 24, because the amplitude of the pulsed signal is, as stated previously, maintained at a value greater than that of the continuous wave signal. Between pulse occurrences, the only output from the limiter is due to oscillator 20 so that the output from discriminator 25 is dependent upon the frequency of oscillator 20. When the IF pulse out of amplifier 13 appears at the input to limiter 24, because its amplitude exceeds that of continuous wave oscillator 20, the output of limiter 24 will be a signal whose frequency is that of the pulse. Thus, during occurrence of a pulse, the output of discriminator 25 will be dependent upon the frequency of the IF pulse out of amplifier 13. If the frequency of the pulsed signal is the same as the frequency of the continuous wave signal, there will be no change in the output of discriminator 25 as the limiter output switches from one signal source to the other. However, if the frequency of the pulsed signal is different from the frequency of the continuous wave signal, a pulse appears at the output of discriminator 25 as the limiter switches from the continuous wave signal source to the pulsed signal source. Furthermore, the polarity of this pulse out of discriminator 25 will be determined by the relation between the two frequencies which gives rise to the discriminator pulse. That is, the pulse has one polarity when the frequency of the pulsed signal is greater than the frequency of the continuous wave signal, and the opposite polarity when the frequency of the pulsed signal is less.

The pulsed output of the discriminator is amplified in pulse amplifier 26 and converted to a D.C. signal in converter 27. The polarity of the signal out of converter 27 is related to the polarity of the pulse out of discriminator 25 and is used to control variable reactance 28 such that the frequency of oscillator 20 is made to approach the frequency of the IF pulse out of amplifier 13. The accuracy with which this result can be accomplished is determined by the unlocked frequency difference, $fd$, and the control loop gain, $G$, being approximately equal to $fd/G$ if $G$ is large. If $A$ is the constant of discriminator 25 (volts out of the discriminator per cycle change in input frequency), $B$ is the voltage gain of pulse amplifier 26, $C$ is the conversion ratio of converter 27 (volts D.C. output per volt of pulse input) and $D$ is the oscillator-variable reactance sensitivity (cycles change in frequency per volt input to the variable reactance), the loop gain $G$ is equal to $A \times B \times C \times D$. Thus, any degree of accuracy may be achieved by making loop gain $G$ large enough to make $fd/G$ as small as desirable.

While there is illustrated and described a continuous wave oscillator controlled by a pulsed signal, the frequency of a pulsed signal can also be controlled by a continuous wave signal, and the circuit shown in the drawing is intended to be merely illustrative of the invention.

Those skilled in the art will now fully appreciate that there is contributed by this invention, a circuit which is capable of automatically locking the frequency of a continuous wave oscillator to the frequency of an externally supplied pulsed reference signal when there is no phase coherence in the pulsed signal. Furthermore, those skilled in the art will further appreciate that the accuracy to which this can be accomplished is dependent only upon the gain of a control loop.

In order to distinguish between a pulse wherein the amplitude oscillates during the pulse and a pulse wherein the amplitude is constant during the pulse, the former is sometimes termed an A.C. pulse and the latter is termed a video pulse.

I claim:

1. An automatic frequency locking circuit for automatically locking the frequency of a continuous wave oscillator to the frequency of a pulsed signal having an amplitude greater than that of the signal produced by said oscillator comprising, a limiter adapted to receive both the pulsed signal and the output from said oscillator, and an AFC circuit responsive to the output of said limiter for producing a tuning control for said oscillator, whereby said oscillator is automatically tuned to the frequency at the output of said limiter.

2. An automatic frequency locking circuit for controlling the frequency difference between a continuous wave signal produced by a first source and a pulsed signal produced by a second source comprising, signal selector means adapted to receive a composite of said two signals and being responsive thereto for producing an output during occurence of a pulse dependent upon the frequency thereof and an output during intervals between pulses dependent upon the frequency of said continuous wave signal, and tuning means responsive to the outputs of said signal selector means for controlling the frequency of one of said sources whereby the frequency thereof is locked to the frequency of the other.

3. The combination, with a first signal source for forming a signal composed of recurring pulses each having a certain frequency, and a second signal source for forming a signal of substantially the same frequency, of signal selector means responsive to a composite of both of said signals for selectively and automatically switching from said second signal source to said first signal source upon initiation of a pulse and from said first signal source to said second signal source upon termination of said pulse, means associated with said signal selector means and being responsive to frequency for producing control outputs dependent upon the frequency of the signal source selected by said signal selector means, and tuning means responsive to said last named means for automatically tuning one of said signal sources to the frequency selected by said signal selector, whereby the frequency thereof is automatically locked to that of the other signal source.

4. In a test set for calibrating the range of a radar set:
   (a) means to receive from the radar set a radar signal composed of a sequence of RF radar pulses;
   (b) means including a first oscillator to convert said RF radar pulses to an IF radar signal composed of a sequence of IF radar pulses;
   (c) means to convert said IF radar pulses to a sequence of video pulses;
   (d) means to convert said video pulses to a sequence of trigger pulses delayed in time relative to said RF radar pulses;
   (e) means including a second oscillator responsive to said trigger pulses for producing a sequence of IF echo pulses delayed with respect to said IF radar pulses; and (f) an automatic frequency locking circuit responsive to said IF radar pulses and the output of said second oscillator for automatically tuning the latter to the same frequency as said IF radar pulses when the frequency of said second oscillator is removed from the frequency of the IF radar pulses by an amount greater than half the difference between the frequency of the IF radar pulses and one of the first sidebands of the IF radar signal, said second oscillar producing a CW signal whose amplitude is less than the amplitude of said IF radar signal, and said automatic frequency locking circuit comprising:

($f_1$) limiter means responsive to a portion of said IF radar signal and a portion of the output of said second oscillator for producing a signal at the frequency of the latter during the interval between the pulses of the IF radar signal at the frequency of the last mentioned pulses during such pulses; and ($f_2$) discriminator means responsive to the signal out of said limiter means for producing, when there is a frequency difference between the pulses of the IF radar signal and the signal of said second oscillator, a pulsed output whose repetition rate is equal to said frequency difference.

5. A test set for calibrating the range of a radar set comprisnig:
(a) means to receive from the radar set a radar signal composed of a sequence of RF radar pulses that have no phase coherence therebetween;
(b) means including a first oscillator to covert said RF radar pulses to an IF radar signal composed of a sequence of IF radar pulses;
(c) means to covert sail IF radar pulses to a sequence of video pulses;
(d) means to covert said video pulses to a sequence of trigger pulses delayed in time relative to said RF radar pulses;
(e) a CW oscillator tuned to substantially the same frequency as said IF radar pulses and producing a signal whose amplitude is less than the amplitude of said IF radar pulses;

(f) a limiter responsive to said IF radar pulses and the CW oscillator signal for producing an output whose frequency is the frequency of said CW oscillator during the interval between said IF pulses and the frequency of said IF pulses during such pulses;
(g) means including a discriminator responsive to the output of said limiter to control the tuning of said CW oscillator for causing the latter to be tuned to the same frequency as said IF radar pulses;
(h) means responsive to said trigger pulses for sequentially gating the output of said CW oscillator to produce a sequence of IF echo pulses delayed with respect to said IF radar pulses and at the same frequency;
(i) means including said first oscillator to convert said IF echo pulses a sequence of RF echo pulses delayed with respect to said RF radar pulses; and
(j) an automatic frequency locking circuit responsive to said IF radar pulses and the output of said second oscillator for tuning the latter to the same frequency as said IF radar pulses when the frequency of said second oscillator is removed from the frequency of the IF radar pulses by an amount greater than half the difference between the frequency of the IF radar pulses and one of the first sidebands of the IF radar signal.

References Cited in the file of this patent
UNITED STATES PATENTS

| | | |
|---|---|---|
| 2,555,121 | Emslie | May 29, 1951 |
| 2,616,049 | Bailey | Oct. 28, 1952 |
| 2,662,180 | Hugenholtz | Dec. 8, 1953 |
| 2,678,439 | McConnell | May 11, 1954 |
| 2,704,323 | Wu | Mar. 15, 1955 |
| 2,752,497 | Ensink | June 26, 1956 |
| 2,828,419 | Gruen | Mar. 25, 1958 |
| 2,942,257 | Huntington | June 21, 1960 |
| 2,952,848 | Zahalka et al. | Sept. 13, 1960 |
| 2,976,411 | Kahn | Mar. 21, 1961 |

OTHER REFERENCES

Radar Test Set AN/GPM–25, by Wm. F. Krocmmelbein, Weapons Guidance Lab., Wright Air Development Center, Wright-Patterson Air Force Base, Ohio (WADC Technical Note No. 57–275), AD #130,158 (18 pp.), July, 1957.